(12) United States Patent
Chinn et al.

(10) Patent No.: US 8,493,573 B2
(45) Date of Patent: Jul. 23, 2013

(54) HIGH-RESOLUTION OPTICAL POSITION SENSING WITH SPARSE, LOW-RESOLUTION DETECTORS

(75) Inventors: Stephen R. Chinn, Alexandria, VA (US); Lew Goldberg, Fairfax, VA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 307 days.

(21) Appl. No.: 13/043,682

(22) Filed: Mar. 9, 2011

(65) Prior Publication Data

US 2012/0229818 A1    Sep. 13, 2012

(51) Int. Cl.
*G01B 11/14*    (2006.01)

(52) U.S. Cl.
USPC .......................................... 356/622; 356/615

(58) Field of Classification Search
USPC ................................................ 356/622, 615
See application file for complete search history.

(56) References Cited

U.S. PATENT DOCUMENTS

| | | | |
|---|---|---|---|
| 6,091,492 A * | 7/2000 | Strickland et al. | 356/336 |
| 6,943,873 B2 | 9/2005 | Sallee | |
| 7,232,229 B2 | 6/2007 | Peeters et al. | |
| 7,400,415 B2 * | 7/2008 | Patzwald et al. | 356/614 |
| 2006/0132472 A1 | 6/2006 | Peeters et al. | |

OTHER PUBLICATIONS

H.L. Van Trees, "Detection, Estimation, and Modulation Theory; Part I", (Wiley, NY), 2001, p. 344.

* cited by examiner

*Primary Examiner* — Tarifur Chowdhury
*Assistant Examiner* — Sunghee Y Gray
(74) *Attorney, Agent, or Firm* — Richard J. Kim

(57) ABSTRACT

High-resolution optical position sensing is disclosed using sparse, low-resolution detectors. Precise location of two-dimensional position or angular orientation of an optical beam at the focal plane of a sensor system is made possible using sparse low-resolution detectors. The beam may be emitted directly from a source, or scattered from a remote target. The high precision in determining the beam or focal spot location is the result of a novel data processing and analysis method for the signals from the low-resolution detectors.

9 Claims, 5 Drawing Sheets

HIGH-RESOLUTION OPTICAL POSITION SENSING WITH SPARSE, LOW-RESOLUTION DETECTORS

GOVERNMENT INTEREST

The invention described herein may be manufactured, used, sold, imported, and/or licensed by or for the Government of the United States of America.

FIELD OF THE INVENTION

This invention relates in general to optical sensors, and more particularly, to optical position sensing detectors.

BACKGROUND OF THE INVENTION

There are several means of detecting the position of an optical source using various types of detectors. A straightforward method is to use a high-resolution focal plane array (a camera), whereby the optical spot position may be found to a precision limited by the camera pixel size and lens characteristics. The drawbacks to this method include the limited readout speed, possible constraints on wavelength, size, and cost of the camera. Another approach, which does not create an image, uses a lateral photo-effect semiconducting position sensing detector (PSD). In this multi-electrode device, the currents from each electrode provide information about the lateral position of the optical beam center hitting the PSD. Limitations of this method include relatively low sensitivity and low-bandwidth (because of the large detector size). Many designs, particularly those based on short-wave infrared (SWIR) sensitive materials also have higher non-linearity in position determination. Alternatively, multi-element detectors, such as semiconductor quad-cells may be used to rapidly achieve centering of the incident optical spot by means of dynamic feedback, but without precise stationary location measurement. One application for this type of sensor is a seeker head in munitions, for targets that are passive emitters or are actively illuminated. One example of this system is described in U.S. Pat. No. 6,943,873 wherein multiple lenses, fibers, and detectors are used to determine target orientation by the directionality associated with each detector. Another useful application is for simple, low-cost means of finding the angle or position of a laser-illuminated pointer spot, particularly at non-visible, eye-safe wavelengths.

SUMMARY OF THE INVENTION

In one aspect, a high-resolution optical position sensing system is disclosed based on sparse, low-resolution detectors. Such a system is comprised of an optical receiver lens capable of optically passing an incident optical field; an array of sensors, each sensor being based on a photo-detector capable of converting an optical input to an electrical output signal, an optical surface of said sensor array being disposed facing said optical receiver lens near a focal plane of said optical receiver lens to detect a spot associated with said incident optical field at the lens; an amplifier connected to each respective sensor of said array of sensors to amplify the strength of said respective electrical output signal; and a digital processor which receives processor inputs based on said amplified signals. Converted digital values based on said processor inputs from said sensors are processed to determine a centroid location of said spot associated with said incident optical field at the lens in terms of a display value. A display based on said display value outputs or displays a location of a distant localized optical source of said spot.

A method for high-resolution optical position sensing using an optical system based on sparse, low-resolution detectors is disclosed. Such a method is comprised of introducing light onto an array of detectors, wherein said light is characterized as an input beam incident as a Gaussian-shaped spot on the array; a plurality of said detectors producing detector signals when said Gaussian-shaped spot on the array is larger than an individual detector element; receiving and digitizing said detector signals at a sampling rate having a sampling interval for digital signal processing, wherein said digitized detector signals are normalized; computing in a digital signal processor a functional form of theoretical signals expected as a function of the spot's lateral x and y coordinates, and likewise normalizing said expected signals; computing in said digital signal processor differences between said digitized detector signals and said expected signals at each x and y coordinate location in a sensor plane for each detector; computing in said digital signal processor a residual error function from the sum of the squares of the differences for all detectors at any x and y coordinate location, and determining the minimum of said residual error function; computing in said digital signal processor the location of the minimum value of said residual error function to derive a minimum least squares estimate of the input beam position x and y coordinate values; converting in said digital signal processor the estimated input beam position coordinate to a two-dimensional angular coordinate in azimuth and elevation values; and displaying a location of a distant localized optical source of said input beam as either a digital readout or on a sensor display.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

We describe a sensor related to a quad-cell, but having more elements, and without the constraint of minimal separation and maximum fill-factor. These individual detector elements can be much larger than the required resolution for spot location. The detector sizes, shapes, and materials can be optimized for the particular application and may be assembled in a monolithic focal plane, or assembled separately as a sparse array of discrete devices. For convenience, the incident light need not impinge directly on the detectors, but may be collected by a set of optical fiber bundles, with each bundle's output routed to an individual detector.

A system and method of processing signals from several detectors is disclosed to achieve precise location of the incident optical beam to a higher degree than allowed by each individual detector. This processing may be applied to a wide range of temporal optical waveforms, allowing greater bandwidth than afforded by the previously mentioned methods. In the example below, we use continuous illumination, but the detector signal amplitudes could be replaced by coefficients derived from demodulation or signal extraction of many types of waveforms (e.g. pulses, sinusoids, etc.).

Figure 4:
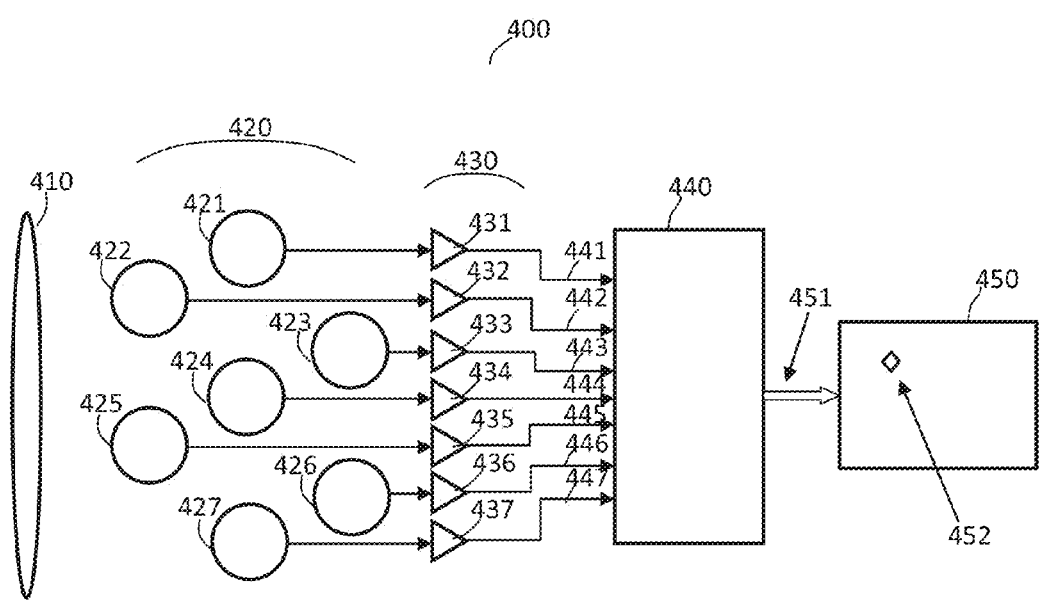
FIG. 4 shows an exemplary system diagram.

FIG. 4 shows an exemplary high-resolution optical position sensing system (e.g., 400) with sparse, low-resolution detectors. Each low-resolution detector, e.g., each sensor (e.g., 421-427), is a photo-detector capable of converting an optical input to an electrical output signal. Typically it is a p-i-n semiconductor photodiode or an avalanche photo-diode. The sensor array 420 is typically near the focal plane of a common optical receiver lens 410, such that the optical input from a distant localized source creates a spot on the sensor array 420 slightly larger than a single sensor. The number of sensors (e.g., 421-427) may vary, and can be optimized for location accuracy versus system complexity. The amplifier (e.g., 431-437 of 430) following each sensor increases the strength of the electrical signal, and for reverse-biased semiconductor photo-diodes, converts the detected photocurrent to a voltage. Each amplified signal (e.g., 441-447) is put into a digital processor e.g., 440) that first converts the analog signal to digital values at appropriate sample times. The simultaneous digital values from the many sensors are processed according to the algorithm described elsewhere in the disclosure that determines the most likely location of the spot centroid created by the incident optical field at the lens (e.g., 410). The sensors (e.g., 421-427) are illustrated as round, but may have other shape, requiring modification of the processing algorithm details. From the fixed parameters of the lens focal length and sensor dimensions, the centroid location is converted to a two-dimensional angle of incidence (azimuth, elevation) for the light incident on the lens. This angular location (e.g., angle value 451) may then be used directly or displayed (e.g., value display 452 on display 450) with another image sensor (such as a digital camera) to give a precise location of a distant localized optical source with respect to the system axis. In one useful application this distant source may be the spot created by scattering from a laser pointer or locator beam.

Figure 1:
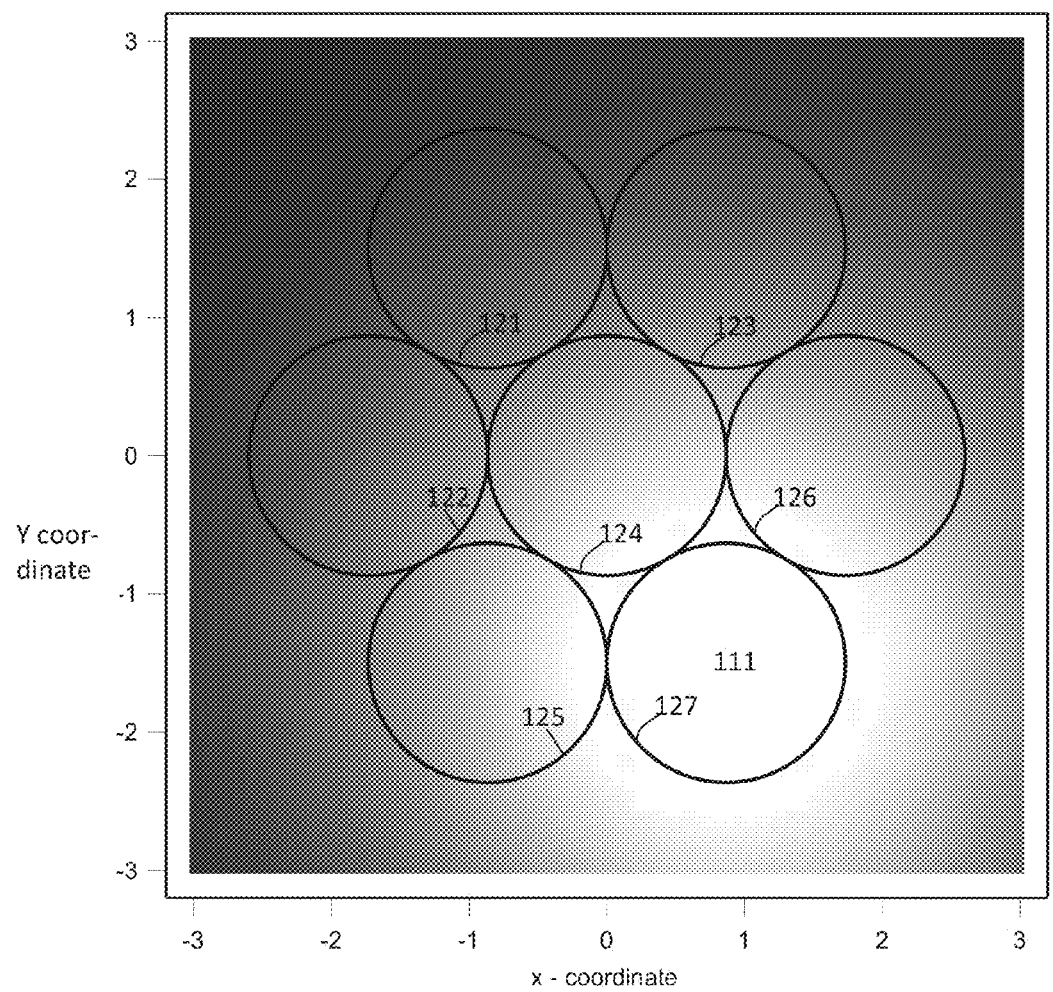
FIG. 1 shows a diagram of detector array and false color image of an exemplary input beam, with beam center at x=0.866, y=−1.500.

We describe this analysis using an example of a 7-element array (e.g., 420) of circular, hexagonally close-packed detectors (e.g., 421-427). The optical system introducing the light onto the detectors is designed such that the Gaussian-shaped spot 111 at the array 420 is on the order of or larger than an individual detector element (e.g., any of 421-427). In this case, more than one detector will produce a response signal. An example of this configuration is shown in FIG. 1, with an incident beam image 111 and detector locations (121-127). Our measurement process is as follows:

(1) Measure each detector signal.

(2) Digitize the signals at the desired rate. For each sampling interval, sum the signals and divide each signal by the sum. This ensures that the result is insensitive to the absolute signal level. The seven normalized signals serve as input to our spot-location algorithm.

(3) Use the functional form for the theoretical signals expected as a function of the spot's lateral (x, y) coordinates. This functional form is parameterized by the beam size, and the detector sizes and locations. For example, for the $i^{th}$ individual circular detector the expected signal is proportional to $$P_i(x-x_i, y-y_i) = 1 - Q(r_i/\sigma, \alpha/\sigma),$$

where Q is the lowest order Marcum Q-function, $r_i$ is the distance between the optical spot center and detector center $$r_i = \sqrt{(x-x_i)^2 + (y-y_i)^2},$$

a is the detector radius, and $\sigma$ is a spot waist parameter. Normalize the expected signals as in step 2.

(4) Find the differences between measured and expected signals at each (x, y) location in the sensor plane for each detector.

(5) Construct a residual error function from the sum of the squares of the differences for all detectors at any (x, y), and find the minimum of this function. The formula for this error function is:

$$E(x, y) = \sum_{i=1}^{N} [P_i(x - x_i, y - y_i) - M_i]^2$$

where $M_i$ is the normalized signal measured from each detector, and $P_i$ is the signal calculated for spot location at (x,y). If desired, each detectors error contribution to this function may be weighted by its signal amplitude.

Figure 2:
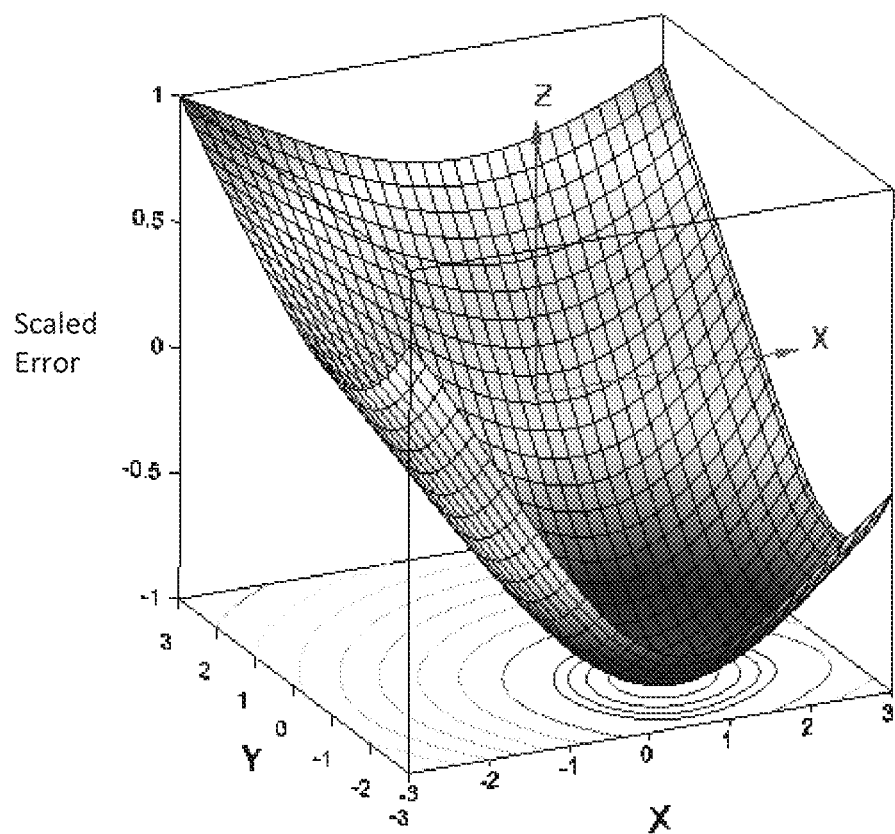
FIG. 2 shows scaled residual error for such an exemplary beam, wherein the contour levels in the bottom plane are at −0.95, −0.9, −0.85, −0.8, −0.6, −0.4, −0.2, 0.0, 0.2, 0.4, 0.6, and 0.8.

(6) The location of the minimum value of function E(x, y) gives a Minimum Least Squares estimate of the input beam position (x, y). The residual error function (with display scaled between −1 and 1) and its minimum, for the example of FIG. 1, are shown in FIG. 2. With noise-free signals, the residual error is zero at the function minimum, and the exact location is achieved to within the numerical precision of the digital processor. In the presence of noise, the location of the function minimum is the best estimate of the beam location.

Figure 5:
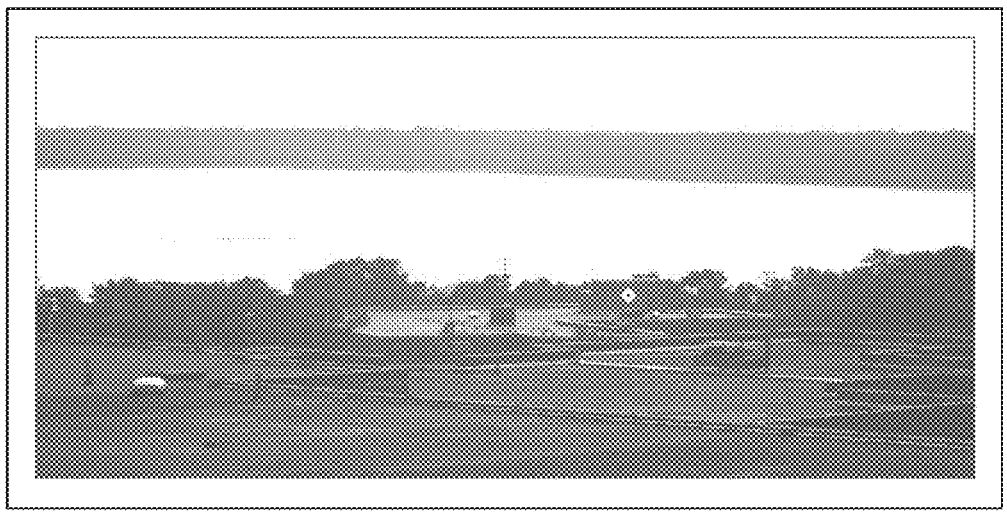
FIG. 5 shows an exemplary scene image display with spot angle indicated by diamond marker to the right of the image center.

(7) Convert the estimated beam position coordinate to a two-dimensional angle (azimuth and elevation), and display it on a digital readout or add it to another sensor display, such as a digital camera scene image. An example of the latter is shown in FIG. 5.

Figure 3:
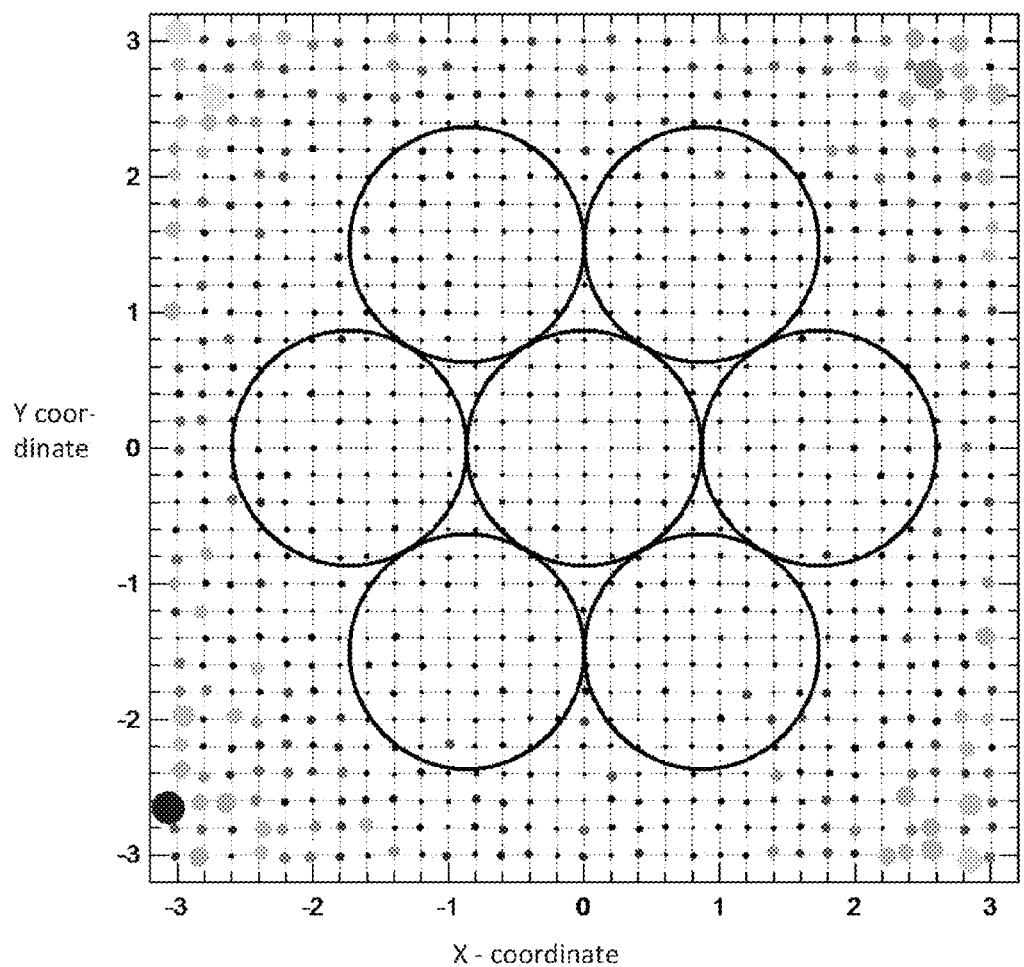
FIG. 3 shows calculated spot position deviation from exemplary rectangular grid points with added noise, wherein brighter coding and larger marker size also indicates larger deviation (0.0002 minimum, 0.084 maximum).

Note that, in the absence of noise, this method provides perfect linearity in position sensing, whether the spot center falls within the detector array or outside it. If noise is present, using signals from all detectors minimizes its effects. In principle, only three detectors are necessary to triangulate the spot location. However, just as having more than two data points improves the quality of fit to straight line, having seven (or more) detectors improves the accuracy of the estimated spot position. As the spot position gets too far from array center, at some point all the signals will be too weak to be useful, but simulations show that excellent linearity and resolution may be achieved everywhere within the detector array, and close to its boundaries. This is illustrated in FIG. 3. We have plotted on a rectangular computation grid, the estimated locations of the simulated sensor outputs at each grid point. In this case noise was added to the simulated input signals, and causes the slight deviations from the input grid positions. The rms position deviation over the entire grid was about 0.01, and the maximum deviation near the corners was about 0.1 (the grid dimensions are based on a detector radius of $\sqrt{3}/2$, in arbitrary units). Converting to actual angular units may be done for any ratio of detector radius to lens focal length.

Similar results were found using simulated square detectors. In this case, the individual signal amplitudes were found using complementary error functions in the x and y coordinates, instead of the Marcum Q-function of a radial coordinate. These round or square shapes may be viewed as being either the detectors themselves or fiber bundles or light-guides through which the light is directed onto detectors. The detectors or optical collector apertures need not have contiguous boundaries, but the higher the array fill-factor, the more efficiently the optical signal is used.

If the spot to be detected comes from scattering from a remote beam, the light that is incident on the collection lens aperture would be approximately uniform. The focal spot would then have a typical Airy diffraction pattern. In this situation, a Gaussian beam can be created by using a radially apodized transmission filter at the sensor collection lens. The Gaussian spot waist at the array should be set by appropriate defocusing to be somewhat larger than the detector or light-guide radius.

In principle, the above error-minimization method could be applied to any beam shape and detector, shape. However, much more complicated numerical processing would have to be applied, essentially performing numerical integration over the aperture for every detector at every function point, given an incident beam profile. The alternative of using closed-form numerical functions is far more efficient, and allows a wide range of real-time applications.

It is obvious that many modifications and variations of the present invention are possible in light of the above teachings. It is therefore to be understood that within the scope of the appended claims, the invention may be practiced otherwise than as described.

What is claimed is:

1. A method for high-resolution optical position sensing using an optical system based on sparse, low-resolution detectors, said method comprising:
   introducing light onto an array of detectors, wherein said light is characterized as an input beam incident as a spot of Gaussian-shaped intensity on the array;
   a plurality of said detectors producing detector signals when said spot of Gaussian-shaped intensity on the array spreads beyond an individual detector element;
   receiving and digitizing said detector signals at a sampling rate having a sampling interval for digital signal processing, wherein said digitized detector signals are normalized;
   computing in a digital signal processor a functional computational model based on expected signals as a function of the spot's lateral x and y coordinates, and likewise normalizing said expected signals;
   computing in said digital signal processor differences between said digitized detector signals and said expected signals at each x and y coordinate location in a sensor plane for each detector;
   computing in said digital signal processor a residual error function from the sum of the squares of the differences for all detectors at any x and y coordinate location, and determining the minimum value of said residual error function;
   computing in said digital signal processor a location of the minimum value of said residual error function to derive a minimum least squares estimate of the input beam position in x and y coordinate values;
   converting in said digital signal processor the estimated input beam position coordinate to a two-dimensional angular coordinate in azimuth and elevation values; and
   outputting a location of a distant localized optical source of said input beam as either a digital readout or on a sensor display.

2. The method for high-resolution optical position sensing according to claim 1, wherein said array of detectors is a 7-element array of circular, hexagonally close-packed detectors.

3. The method for high-resolution optical position sensing according to claim 1, wherein for each sampling interval each signal is normalized by dividing each signal by the sum of the signals, whereby the resulting normalized signals may be rendered insensitive to absolute signal levels as normalized signal input to a spot-location algorithm.

4. The method for high-resolution optical position sensing according to claim 1, wherein said functional computational model is parameterized by the beam size, and the detector sizes and locations, wherein for the $i^{th}$ individual circular detector, the expected signal is proportional to $$P_i(x-x_i, y-y_i) = 1 - Q(r_i/\sigma, a/\sigma),$$

where Q is the lowest order Marcum Q-function, $r_i$ is the distance between the optical spot center and detector center $$r_i = \sqrt{(x-x_i)^2 + (y-y_i)^2},$$

a being the detector radius, and $\sigma$ being spot waist parameter.

5. The method for high-resolution optical position sensing according to claim 1, wherein said residual error function is:

$$E(x, y) = \sum_{i=1}^{N} [P_i(x - x_i, y - y_i) - M_i]^2,$$

where $M_i$ is the normalized signal measured from each detector, and $P_i$ is the signal calculated for spot location at x and y coordinate location, wherein each detector's error contribution to said residual error function can be weighted by its signal amplitude.

6. The method for high-resolution optical position sensing according to claim 1, wherein said location of the computed function minimum is set as the computed estimate of the beam location.

7. The method for high-resolution optical position sensing according to claim 1, wherein linearity in detected position sensing can be realized in the absence of noise when the spot center falls within or outside the detector array, whereas if noise is present, using detector signals from all detectors attenuates the noise effects.

8. The method for high-resolution optical position sensing according to claim 1, wherein three detectors are necessary to triangulate the spot location, whereas having more data points improves the quality of fit to straight line, with more detectors improving the accuracy of the estimated spot position.

9. The method for high-resolution optical position sensing according to claim 1, wherein for square detectors, individual signal amplitudes are determined using complementary error functions in the x and y coordinates, wherein said optical shape may be due to either the detectors themselves or fiber bundles or light-guides through which the light is directed onto detectors.

* * * * *